(12) United States Patent
Ortman et al.

(10) Patent No.: US 12,007,790 B2
(45) Date of Patent: Jun. 11, 2024

(54) SYSTEMS AND METHODS FOR SERVICE DRONE LANDING ZONE OPERATIONS

(71) Applicant: Ford Global Technologies, LLC, Dearborn, MI (US)

(72) Inventors: Richard Ortman, Saline, MI (US); Syed Amaar Ahmad, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 283 days.

(21) Appl. No.: 17/343,470

(22) Filed: Jun. 9, 2021

(65) Prior Publication Data

US 2022/0397915 A1    Dec. 15, 2022

(51) Int. Cl.
| | |
|---|---|
| *G05D 1/00* | (2024.01) |
| *B64C 39/02* | (2023.01) |
| *B64U 10/13* | (2023.01) |
| *G01C 21/00* | (2006.01) |
| *G06V 20/10* | (2022.01) |
| *G06V 20/56* | (2022.01) |

(52) U.S. Cl.
CPC .......... *G05D 1/101* (2013.01); *B64C 39/024* (2013.01); *G01C 21/005* (2013.01); *G06V 20/10* (2022.01); *G06V 20/56* (2022.01); *B64U 10/13* (2023.01)

(58) Field of Classification Search
CPC ........ G05D 1/101; B64U 10/13; G06V 20/56; G01C 21/005; B64C 39/024
See application file for complete search history.

(56) References Cited

U.S. PATENT DOCUMENTS

| 10,049,589 | B1* | 8/2018 | Boyd | B64D 47/08 |
|---|---|---|---|---|
| 10,395,544 | B1* | 8/2019 | Harris | G08G 5/0069 |
| 10,657,343 | B1* | 5/2020 | Studnicka | G06Q 20/3276 |
| 2008/0059065 | A1* | 3/2008 | Strelow | G01S 19/14 |
| | | | | 342/357.52 |
| 2017/0092109 | A1* | 3/2017 | Trundle | B60L 53/305 |
| 2018/0050800 | A1* | 2/2018 | Boykin | H04N 21/4223 |

(Continued)

FOREIGN PATENT DOCUMENTS

CN    109032169 A    12/2018

OTHER PUBLICATIONS

Kuan-I Lu et al, "Device-free CSI-based Wireless Localization for High Precision Drone Landing Applications", Department of Electrical and Computer Engineering, National Chiao Tung University, Hsinchu, Taiwan, IEEE 2019, 5 pages.

(Continued)

*Primary Examiner* — Marc Burgess
*Assistant Examiner* — John D Holman
(74) *Attorney, Agent, or Firm* — Emily Drake; Eversheds Sutherland (US) LLP (57) ABSTRACT

Systems and methods for service drone landing zone operations are disclosed herein. An example method includes determining location-specific information for a location, the location-specific information including at least images of the location from at least one of a vehicle or a mobile device at the location, determining a landing area for a drone at the location using the location-specific information, receiving localizing signals from at least one of the vehicle or the mobile device as the drone approaches the location, and causing the drone to land in the landing area using the localizing signals.

13 Claims, 4 Drawing Sheets

(56) References Cited

U.S. PATENT DOCUMENTS

| | | |
|---|---|---|
| 2018/0281941 A1* | 10/2018 | Hutson ................ B64C 39/024 |
| 2019/0118973 A1 | 4/2019 | Di Benedetto et al. |
| 2019/0248487 A1 | 8/2019 | Holtz et al. |
| 2020/0357286 A1 | 11/2020 | Liu et al. |
| 2020/0365041 A1 | 11/2020 | Kasilya Sudarsan et al. |

OTHER PUBLICATIONS

Srikanth Saripalli et al, "Vision-based Autonomous Landing of an Unmanned Aerial Vehicle", IEEE International Conference on Robotics and Automation, Washington, D.C., May 2002, 6 pages.

* cited by examiner

SYSTEMS AND METHODS FOR SERVICE DRONE LANDING ZONE OPERATIONS

BACKGROUND

Drones can be used to respond to events, including emergency events, where a vehicle may be stranded or a user is stranded with their phone. To dispatch a drone, such as an unmanned aerial vehicle (UAV) in an emergency service situation, a feasible landing location should be identified in order to facilitate the landing of the drone in proximity to the vehicle. Some existing methods for pre-determination of a drone landing location may include establishing pre-defined static landing locations, historic landing locations, using neural networks (e.g., artificial intelligence), and ad-hoc discovery using images, dispatch control, and sensors integrated into the drone. During ad-hoc operations, the drone must be located on-site in order to view a potential landing area.

In emergency response situations, a drone's landing options may be limited or severely restricted. Also, when the vehicle is located in a remote area, flying the drone to the landing area, only to find out that it is impossible to infeasible to land the drone, results in cost and time delays when rendering aid.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure pertains to systems and methods used to enable the landing of a drone in a location using pre-determined or live, location-specific information. For example, a drone can be dispatched to a location of a disabled vehicle, or a location where a user may be stranded with their mobile device (e.g., a lost hiker for example). The systems and methods herein allow the drone, a service provider, a mobile device, and/or a vehicle to determine if an acceptable landing area exists at the location using location-specific information obtained from sensors of the vehicle or from content obtained from a mobile device of a user.

In one example, a consumer's cellular device, or vehicle mounted cameras and sensor technology, enable third-party facilitation for drone landing area discovery and dispatch assistance. In conjunction with GPS (global positioning system), satellite imagery, the camera(s) of the consumer's cellular device, or vehicle, are used to create an on-site view of the desired landing area, as well as provide a camera feed into flight control image recognition systems for environment object assessment, detection, and landing of the drone.

The drone may be equipped with various technologies to assist with landing and object detection, from radar to additional cameras, but the consumer's cellular device, and/or vehicle, can be used in coordination the drone's flight control software (or service provider enabled command and control software) to pre-asses the landing area before the drone is even deployed, as well as for flight control assistance once the drone is on site. The pre-assessment may occur through both photo and video imagery provided to the service provider (periodic photos, panorama, 360-degree, live video stream to dispatch, AR (augmented reality) guides, alternate image processing, etc.). A mobile application executing on the mobile device can enable communication with the service provider. The user can utilize their drone control application to interact with the service provider, and provide location-specific information such as coordinates/pin drops, to communicate more effectively; this could occur through a vehicle infotainment system as well. The mobile device can utilize the drone control application to directly interact with the drone as well, providing localizing information used by the drone to create approach vectors for landing.

The service provider and/or drone controller can implement mathematical logic and DSP (digital signal processing) techniques to calculate available landing space sizes, as well as ground clearance to structures and obstructions above the vehicle. The user may work in coordination with the service provider and/or utilize AR guides to assess alternate approach vectors to achieve a feasible landing for the drone. For example, the drone and/or service provider may determine that no feasible landing area exists. The user can be prompted to explore areas around the vehicle that may be more acceptable for drone landing. Once found, the drone can home in on localizing signals of the drone.

The consumer's cellular device may also serve as a landing beacon, which provides both video and RF (radio frequency) interfaces for the drone or dispatch to use to assist with landing. Vehicle sensor output such as radar, LIDAR (light ranging and detection), and cameras may be used similarly. The mobile device or vehicle may function as such a landing beacon via localization technology installed on the drone, cellular device, or vehicle, such as BLUETOOTH 5.1 or UWB (ultra-wideband). The mobile device could be placed on the ground or held by the user as a means of identifying a location of an approach vector for landing. Audio or ultrasonic beaconing may be used as well for the drone to identify proximity to the cellular device. As the drone approaches the landing location, dispatch will instruct the consumer to point the camera at the drone and landing location so that they can confirm the location is free of humans and safety hazards, as well as to use for landing assistance. Data from the vehicle, such as radar or LIDAR, may be used by the service provider and/or the drone for confirmation of its proximity to the vehicle, and so forth.

Night operations provide extra challenges to such interactions with dispatch, landing spot determination, and drone guidance and landing. Vehicle or handset lights may be used as additional support for drone guidance. The in-vehicle or mobile application may provide the service provider and/or the drone access to the vehicle/mobile device light controls to issue patterns to be flashed for the drone to be able to detect and identify the customer on the approach vector.

ILLUSTRATIVE EMBODIMENTS

Figure 1:
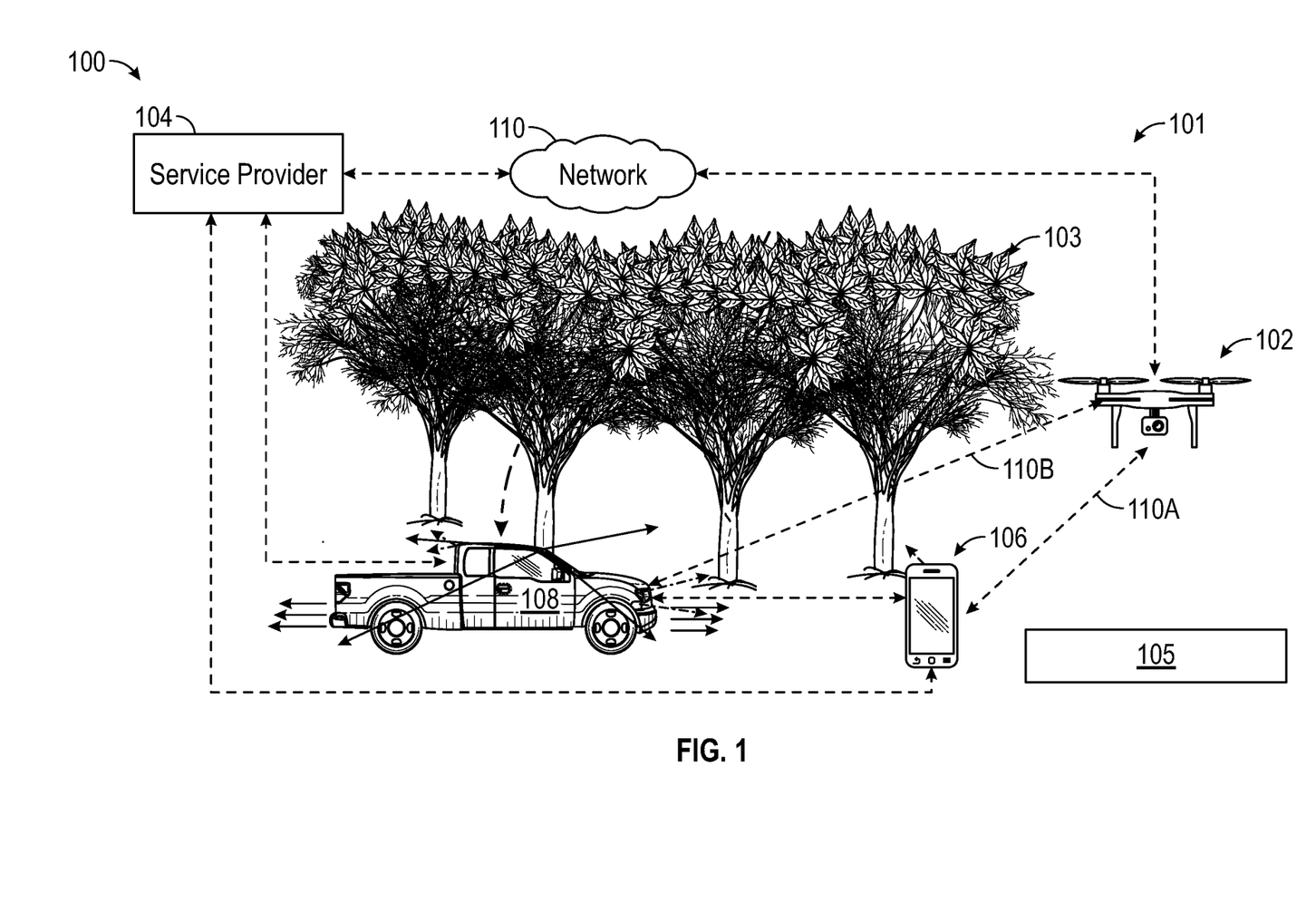
FIG. 1 illustrates an example architecture where the systems and method of the present disclosure may be practiced.

Turning now to the drawings, FIG. 1 depicts an illustrative architecture 100 in which techniques and structures of the present disclosure may be implemented. The architecture 100 includes a drone 102, a service provider 104, a mobile device 106, a vehicle 108, and a network 110. Some or all of these components in the architecture 100 can communicate with one another using the network 110. The network 110 can include combinations of networks that enable the components in the architecture 100 to communicate with one another. The network 110 may include any one or a combination of multiple different types of networks, such as cellular, cable, the Internet, wireless networks, and other private and/or public networks. In some instances, the network 110 may include Wi-Fi or Wi-Fi direct. The drone 102 and the vehicle 108 can communicate over a short-range or radiofrequency link 110B, such as BLUETOOTH or ultra-wideband. The drone 102 and the mobile device 106 can communicate over another short-range or radiofrequency link 110A. All of the components depicted in FIG. 1 can communicate over the network 110 and/or directly with one another.

The vehicle 108 is positioned in a location 101, and the vehicle 108 may be surrounded by objects such as trees 103, but also animals and humans, just to name a few. Ground clearance may or may not exist relative to objects in the location 101. A landing area 105 may also exist in the location 101. To be sure, in some instances, ground clearance or crowding of objects may preclude the existence of a landing area. The location 101 can comprise a landing area 105 that is located just beyond a tree line of the trees 103.

Figure 2:
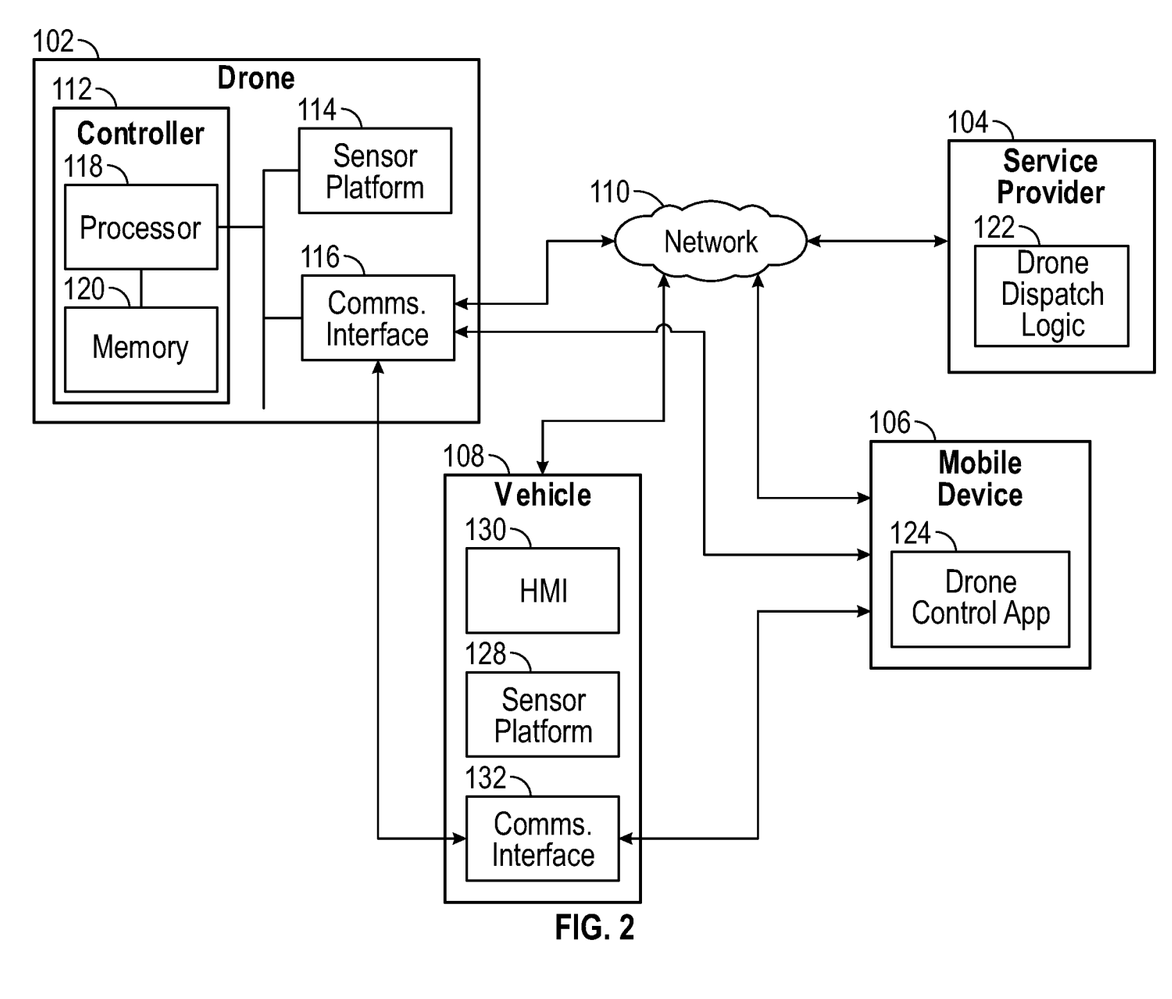
FIG. 2 is a schematic diagram of components of the architecture of FIG. 1.

Referring now to FIGS. 1 and 2, the drone 102 may comprise a controller 112, a sensor platform 114, and a communications interface 116. The controller 112 may comprise a processor 118 and memory 120 for storing instructions. The processor 118 executes instructions stored in memory 120 to perform any of the methods disclosed herein. When referring to actions performed by the controller 112 or drone 102, this implicitly involves the execution of instructions by the processor 118. In one example, the memory 120 can store and execute flight control logic and/or image processing logic.

It will further be understood that while not necessarily illustrated, each component of the architecture such as the mobile device, the service provider, and/or the vehicle can be equipped with one or more processors and one or more memories for storing instructions that allow the respective component to perform actions disclosed herein. Further, each of the components can include hardware for accessing the network 110.

Many of the descriptions and examples provided herein may be described from the point of view of either or both of the drone 102 or the service provider 104. It will be understood that some steps of these methods can be implemented solely at the drone level, solely at the service provider, or cooperatively between the drone 102 and the service provider 104. Thus, both the drone 102 and/or the service provider can implement flight control logic and/or image processing logic.

The sensor platform 114 can comprise a camera, a LIDAR sensor, radar, ultrasonic, audio sensors, or any combinations thereof. In general, the sensor platform 114 allows the controller 112 to collect data around the location 101.

The service provider 104 can include one or more processors and memory that utilize drone dispatch logic 122 to provide enable control of the drone 102. The service provider 104 can include one or more processors and one or more memories that store the drone dispatch logic 122. In some instances, the service provider 104 can enable a user of the mobile device 106 to participate in the drone control processes disclosed herein.

The mobile device 106 can store and execute a drone control application 124 to allow the mobile device 106 to communicate with the service provider 104 and the drone 102. Configuration and use of the mobile device 106 and/or the logic of the drone control application 124 will be explained in greater detail herein. The mobile device 106 can include a sensor platform 126 that can include a camera, an ultrasonic sensor, or any other sensor that can be utilized in accordance with the present disclosure.

The vehicle 108 can include a connected vehicle that includes a sensor platform 128, and a human-machine interface (HMI 130) such as an infotainment system. The vehicle 108 may comprise a communications interface 132 that allows the vehicle 108 to transmit and/or receive data over the network 110. The vehicle may also include one or more processors and memory. The communications interface 132 can also enable vehicle-to-drone communication. The sensor platform 128 can comprise a camera, a LIDAR sensor, radar, ultrasonic, audio sensors, or any combinations thereof. In general, the sensor platform 128 allows for the collection of location-specific information about the location 101.

The location-specific information can include advanced location-specific information and real-time location-specific information (may coincide with the localizing information disclosed herein). For example, before launching the drone, the drone can receive advanced location-specific information from the service provider 104, the mobile device 106, and/or the vehicle 108, depending upon the use case.

Examples of location-specific information can include still images, video, panoramic images, 360-degree images, a live video stream, and augmented reality representations. In one example, location-specific information is gathered by the mobile device 106 and transmitted to the service provider 104. For example, data can be gathered by a camera of the sensor platform 126 of the mobile device 106. In one example, a user can utilize the camera of the mobile device to obtain images or video of the location 101. This can include a view of the vehicle 108 and the objects around the vehicle 108. The service provider can forward the location-specific information to the drone 102.

In another example, the location-specific information can be obtained by the sensor platform 128 of the vehicle 108. The service provider can forward the location-specific information to the drone 102. In some examples, advance location-specific information is gathered by both the mobile device 106 and the vehicle 108 for provision to the drone 102 directly through the network 110 or indirectly through the service provider 104. The location-specific information can be forwarded through the service provider 104 in instances where the service provider 104 conducts all or a portion of the image recognition and/or flight path analysis disclosed herein.

In some configurations, the controller 112 of the drone 102 can receive the location-specific information (specifically the advanced location-specific information) and determining a landing area for a drone 102. For example, the controller 112 can receive images or video and perform image processing to identify objects, such as trees or individuals in the images or video.

In some instances, the controller 112 can combine this location-specific information with other parameters, such as LIDAR signals obtained from the sensor platform 128 of the vehicle 108 that may indicate how far the vehicle 108 is spaced apart from the trees. Other location-specific information can include determining ground clearance between the vehicle 108 and objects located near and/or above the vehicle 108. For example, the controller 112 can analyze images/video obtained from both the vehicle 108 and the mobile device 106, which each provide images/video of the location 101 from unique perspectives. The controller 112 can identify, for example, branches of the trees 103 that may overhang the vehicle 108 or areas around that vehicle 108 that would otherwise serve as a suitable landing area.

The controller 112 can obtain satellite or other map renderings of the location 101 using GPS signals of the location 101 obtained from the mobile device 106 or vehicle 108. The location can also be determined from a pin drop on the mobile device 106. The controller 112 can utilize all these location-specific information types to determine if the landing area 105 is available at the location 101. In some instances, the controller 112 can calculate an available size of the landing area 105. When the calculated size is at or above a threshold landing size (could be a polygonal area that is measured), the controller 112 may determine that a suitable landing area exists. For example, if the drone 102 needs 100 square feet to land safely, the size of the landing area 105 should be at least 100 square feet.

In instances where no suitable landing area can be determined, the controller 112 can transmit a signal to the mobile device 106 that instructs a user of the mobile device 106 to locate an alternative landing area. For example, the user could search for an alternative landing area away from the trees or other objects that may block most portions of the location 101.

The controller 112 may determine that a landing area is available prior to launch. That is, the drone 102 may not be launched in some instances until a feasible landing area is located. This can prevent the drone 102 from being dispatched to a location where no landing area can be found or occupied, preventing wasted time and operating expense for the drone 102.

When the drone is launched, the controller 112 can navigate the drone 102 to the location 101 based on the location-specific information of the mobile device 106 and/or the vehicle 108. The drone 102 can be launched autonomously or in response to a request from the service provider 104, mobile device 106, and/or the vehicle 108. The drone 102 can autonomously launch when a service request has been received and the controller 112 has determined that a landing area is available at the location 101.

In some instances, the mobile device 106 and/or vehicle 108 act as a beacon that periodically emits location information that can be received by the controller 112. The drone 102 can home in on the signals. In other examples, the controller 112 can utilize stored maps to navigate from its dispatch position to the location 101.

When the drone 102 arrives near the location 101, the drone 102 can be configured to land in the landing area 105. The drone 102 can utilize images/video obtained by a camera of the drone's sensor platform 114. The controller 112 can process the images/video to guide the drone 102 into landing within the landing area 105. As noted above, the controller 112 can visually identify the landing area 105 that was identified pre-flight from the images/video obtained during landing. In other instances, the controller 112 can visually identify the landing area 105 on-the-fly when no landing area 105 was pre-identified before flight. Indeed, while some instances involve the drone 102 not launching when a landing area cannot be identified pre-flight, some instances involve the drone 102 being dispatched anyway.

In some instances, the mobile device 106 and/or the vehicle 108 can be configured to act as a beacon to guide the drone 102 into position over the landing area 105. The mobile device 106 and/or the vehicle 108 can be equipped to emit localizing signals, such as ultrasonic signals, LIDAR, audio signals, and the like. The localizing signals can include short-range wireless signals such as BLUETOOTH and/or UWB signals emitted from communication interfaces as well. Thus, localizing signals can be emitted by a sensor of a sensor platform or a communications interface of either or both of the mobile device 106 or the vehicle 108.

The drone 102 can receive these localizing signals from at least one of the vehicle or the mobile device as the drone approaches the location 101. In one example, a user can place their mobile device 106 in the landing area 105 and the drone 102 can home in on the localizing signals to land in the landing area 105. Thus, the controller 112 causes the drone to land in the landing area using the localizing signals. Again, localizing signals are not required in all instances, but may be advantageous in situations where a view of the vehicle 108 may be blocked by objects such as trees or buildings. The controller 112 can utilize the localizing signals, along with other location-specific information to calculate an approach vector for landing. The approach vector provides control commands for guiding the drone 102 into the landing area 105.

The user of the mobile device 106 can be instructed through the drone control application 124 to point a camera of the mobile device 106 at the drone 102. The user can also capture, alone or in combination with the drone, images of the location 101 and/or specifically the landing area 105.

Figure 3:
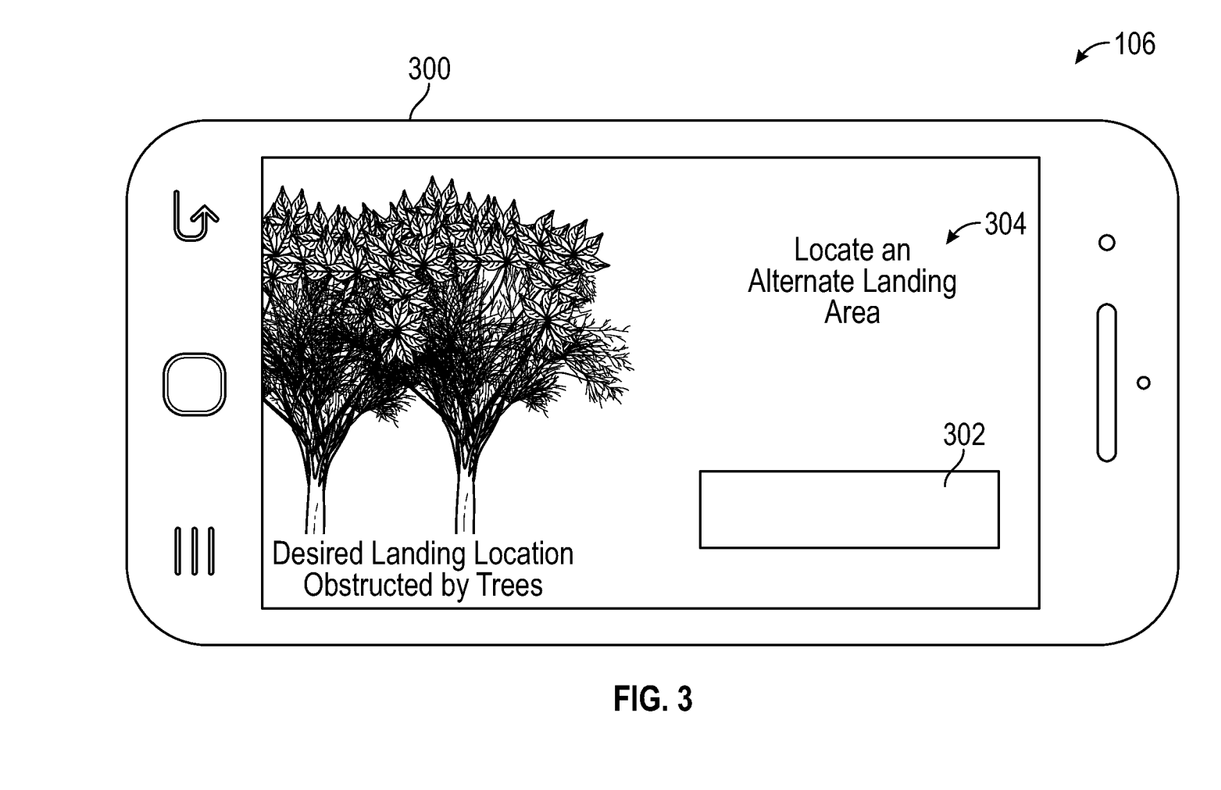
FIG. 3 is a perspective view of an example mobile device providing an augmented reality experience to land a drone.

In some instances, the approach vector is updated dynamically as the user moves the mobile device 106 in the location 101. For example, if the controller 112 is unable to calculate an approach vector or cannot determine a suitable landing area, the controller 112 can transmit a message to the mobile device 106 that instructs the user to look for an alternative landing area. The user can point the camera of the mobile device 106 in various directions to attempt to identify an alternative landing area. Referring to FIG. 3, in one example, the mobile device 106 can display an augmented reality interface 300. The interface 300 includes a virtual boundary 302 that approximates a landing area size that is required for landing the drone. When the user points their mobile device at an area, the virtual boundary 302 is applied to the image obtained by the camera. When the location is determined to have a landing area sized to receive the drone, the localizing signals emitted by the mobile device 106 can direct the drone to the updated location. As noted above, a message can be presented to a user that instructs the user to identify an alternative landing area when the proposed landing area is occupied or obstructed. To be sure, the landing area may be unobstructed when the drone is launched, but may subsequently become obstructed. In these instances, the drone may determine that the landing area is not suitable and request that the user identify an alternate landing area with their mobile device.

Night operations provide extra challenges to such interactions with respect to identifying a landing area, and drone guidance, and landing. The vehicle 108 and/or mobile device 106 can provide access to the light controls of either or both of the mobile device 106 and the vehicle 108 to issue light emission patterns to be flashed for the drone 102 to detect during execution of the drone's approach vector. Light control may also be used for other parts of the drone flight sequences, such as landing, where the use of light from a mobile device or vehicle could prove very useful. The drone 102 can directly control the light of the mobile device 106 and/or the vehicle 108 using short-range wireless communications. The mobile device 106 can grant permission to the controller 112 of the drone 102 to control operations of the light, for example. In another example, the drone 102 can transmit a light pattern to the service provider 104, which forwards the instructions to the mobile device 106 and/or the vehicle 108.

Figure 4:
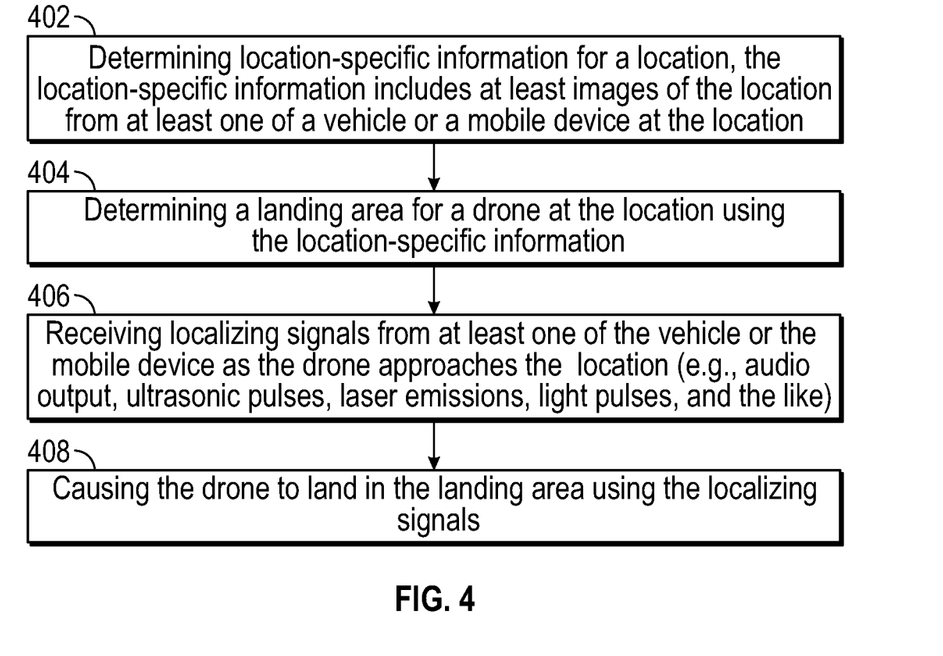
FIG. 4 is flowchart of an example method of the present disclosure.

FIG. 4 is a flowchart of an example method of the present disclosure. The method can include a step 402 of determining location-specific information for a location. The location can include any place where a vehicle has been stranded or another emergency event has occurred or is occurring. In some instances, the location-specific information includes at least images of the location from at least one of a vehicle or a mobile device at the location. Images can include various formats of photographs, video, and the like.

Next, the method can include a step 404 of determining a landing area for a drone at the location using the location-specific information. Step 404 may occur pre-flight, allowing the drone or a service provider to determine if the drone should be dispatched. When no suitable landing area can be located, the drone may not be dispatched.

Once the drone is dispatched and is within a specified range of the location, the method can include a step 406 of receiving localizing signals from at least one of the vehicle or the mobile device as the drone approaches the location. These localization signals can include audio output, ultrasonic pulses, laser emissions, light pulses, and the like. The method includes a step 408 of causing the drone to land in the landing area using the localizing signals. This can include the drone calculating an approach vector based on the localizing signals, along with other location-specific information obtained from the mobile device or vehicle, along with other information available to the drone such as maps or satellite images. When no localization signals are available, the drone can calculate its approach vector from images/video (obtained by the drone and/or the mobile device and vehicle) and/or maps available to the drone.

Figure 5:
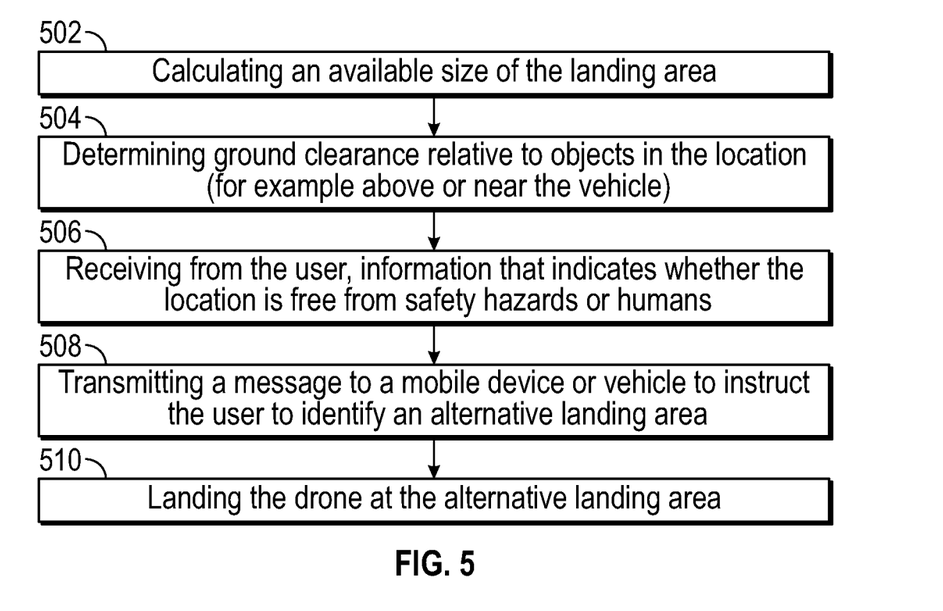
FIG. 5 is another flowchart of an example method of the present disclosure.

As illustrated in FIG. 5, in some instances, the step of determining the landing area comprises both a step 502 of calculating an available size of the landing area and a step 504 of determining ground clearance relative to objects in the location. The method can also include a step 506 of receiving from the user, information that indicates whether the location is free from safety hazards or humans. For example, the user can indicate that the location is free from safety hazards or humans using the drone control application that executes on their mobile device.

If the landing area cannot be used, the method can include a step 508 of transmitting a message to a mobile device or vehicle to instruct the user to identify an alternative landing area. If an alternative landing area is discovered, the method can include a step 510 of landing the drone at the alternative landing area. This can include using real-time localization signals from the mobile device and/or a feed from a camera of the drone, the mobile device, and/or the vehicle.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems, and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method comprising:
receiving a request to dispatch a drone to a location of a vehicle;
determining, by at least one processor of a drone, location-specific information for a location, wherein the location-specific information comprises information from each of a camera of a vehicle at the location, a LIDAR sensor of the vehicle, a radar sensor of the vehicle, an ultrasonic sensor of the vehicle, and an audio sensor of the vehicle;
determining, by the processor, prior to dispatching the drone, and based on the location-specific information, a first landing area for the drone at the location;
determining that the drone cannot land at the first landing area;
preventing the drone from launching;

transmitting a message to the vehicle that instructs a user to locate an alternative landing area;

determining a second landing area for the drone at the location;

determining, by the processor as the drone approaches the location, localizing signals emitted periodically from each of the camera, the LIDAR sensor, the radar sensor, the ultrasonic sensor, and the audio sensor which causes the vehicle to act as a beacon to guide the drone to the location;

determining, by the processor, global positioning system signals and satellite images in combination with the location-specific information to determine the second landing area; and causing, by the processor and based on the localizing signals, the drone to land in the second landing area.

2. The method according to claim 1, wherein determining the second landing area comprises:

calculating, by the processor, an available size of the second landing area; and determining, by the processor, ground clearance relative to objects in the location.

3. The method according to claim 1, further comprising displaying instructions on a mobile device to instruct a user to point a camera of the mobile device at the drone when the drone is proximate the location.

4. The method according to claim 1, further comprising determining, by the processor, an approach vector to the second landing area based on the localizing signals.

5. The method according to claim 4, further comprising determining, by the processor and based on information provided by a user of a mobile device, whether the location is free from safety hazards or humans.

6. The method according to claim 4, further comprising illuminating, by the processor, a light on the vehicle to illuminate the second landing area.

7. The method according to claim 1, wherein the location-specific information further comprises information gathered from a mobile device of a user, wherein the location-specific information provided by the vehicle is at a first perspective, with respect to the location, wherein the location-specific information provided by the mobile device is at a second perspective, with respect to the location, wherein the first and second perspectives are different, and wherein the method further comprises analyzing, by the processor of the drone, the location-specific information from each of the vehicle and the mobile device.

8. The method according to claim 7, further comprising determining, by the processor as the drone approaches the location, localizing signals emitted periodically from the mobile device which causes the mobile device to act as a second beacon to guide the drone to the location.

9. The method of claim 1, wherein determining a second landing area for the drone at the location further comprises:

presenting an augmented reality interface including a virtual boundary that approximates a landing area size required for landing the drone.

10. A drone comprising:

a processor; and a memory for storing instructions, the processor is configured to execute the instructions to:

receive a request to dispatch a drone to a location of a vehicle;

prior to launching the drone, determine location-specific information for a location, the location-specific information comprising information from each of a camera of a vehicle at the location, a LIDAR sensor of the vehicle, a radar sensor of the vehicle, an ultrasonic sensor of the vehicle, and an audio sensor of the vehicle;

determine, prior to dispatching the drone, and based on the location-specific information, a first landing area for the drone at the location information;

determine that the drone cannot land at the first landing area;

prevent the drone from launching;

transmit a message to the vehicle that instructs a user to locate an alternative landing area;

determining a second landing area for the drone at the location;

navigate the drone to the location;

receive localizing signals from the vehicle when the drone is at the location, the localizing signals being emitted periodically from each of the camera, the LIDAR sensor, the radar sensor, the ultrasonic sensor, and the audio sensor which causes the vehicle to act as a beacon to guide the drone to the location;

determining, by the processor, global positioning system signals and satellite images in combination with the location-specific information to determine the second landing area; and cause the drone to land in the second landing area using the localizing signals.

11. The drone according to claim 10, wherein the location-specific information is received prior to launching the drone.

12. The drone according to claim 10, wherein images from the camera include any one or more of still images, video, panoramic images, 360-degree images, a live video stream, and augmented reality representations.

13. The drone according to claim 10, wherein the processor is configured to determine an available size of the second landing area for the drone, as well as ground clearance relative to objects above the vehicle.

* * * * *